US007882539B2

(12) United States Patent
Paramasivam et al.

(10) Patent No.: US 7,882,539 B2
(45) Date of Patent: Feb. 1, 2011

(54) ABSTRACTING SECURITY POLICY FROM, AND TRANSFORMING TO, NATIVE REPRESENTATIONS OF ACCESS CHECK MECHANISMS

(75) Inventors: Muthukrishnan Paramasivam, Seattle, WA (US); Charles F. Rose, III, Bellevue, WA (US); Dave M. McPherson, Bothell, WA (US); Raja Pazhanivel Perumal, Issaquah, WA (US); Satyajit Nath, Redmond, WA (US); Paul J. Leach, Seattle, WA (US); Ravindra Nath Pandya, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 1071 days.

(21) Appl. No.: 11/445,778

(22) Filed: Jun. 2, 2006

(65) Prior Publication Data

US 2007/0283411 A1   Dec. 6, 2007

(51) Int. Cl.
*G06F 17/00* (2006.01)
*H04L 29/06* (2006.01)
(52) U.S. Cl. .............................. 726/1; 726/26; 726/27; 726/28
(58) Field of Classification Search .................... 726/1; 706/47
See application file for complete search history.

(56) References Cited

U.S. PATENT DOCUMENTS

| 5,566,328 | A | 10/1996 | Eastep ..................... 395/600 |
| 5,913,218 | A | 6/1999 | Carney et al. ............... 707/200 |
| 6,236,988 | B1 | 5/2001 | Aldred ......................... 707/3 |
| 6,463,470 | B1 | 10/2002 | Mohaban et al. |
| 6,571,231 | B2 | 5/2003 | Sedlar ......................... 707/1 |
| 6,654,769 | B2 | 11/2003 | Ito et al. ..................... 707/200 |
| 7,216,125 | B2* | 5/2007 | Goodwin ....................... 707/9 |
| 2002/0042796 | A1 | 4/2002 | Igakura ..................... 707/205 |
| 2004/0148272 | A1 | 7/2004 | Raman et al. ................ 707/1 |
| 2004/0186849 | A1 | 9/2004 | Enko et al. ................. 707/102 |
| 2005/0203950 | A1 | 9/2005 | Rajan et al. ............ 707/103 R |
| 2006/0161444 | A1* | 7/2006 | Lubrecht et al. .............. 705/1 |
| 2007/0169168 | A1* | 7/2007 | Lim ............................. 726/1 |
| 2007/0174223 | A1* | 7/2007 | Holmes et al. ............... 706/47 |
| 2008/0028436 | A1* | 1/2008 | Hannel et al. ................ 726/1 |

OTHER PUBLICATIONS

Samarati, P. et al., "Access Controls: Policies, Models, and Mechanisms", Foundations of Security Analysis and Design: Tutorial Lectures (FOSAD), 2000, LNCS 2171, 137-196.
Anderson, O.T., et al, "Global namespace for files," *IBM Systems Journal*, 2004, 43(4), http://www.research.ibm.com/journal/sj/434/anderson.html, 19 pages.

(Continued)

*Primary Examiner*—Jung Kim
*Assistant Examiner*—Abdulhakim Nobahar
(74) *Attorney, Agent, or Firm*—Woodcock Washburn LLP (57) ABSTRACT

Abstracting access control policy from access check mechanisms allows for richer expression of policy, using a declarative model with semantics, than what is permitted by the access check mechanisms. Further, abstracting access control policy allows for uniform expression of policy across multiple access check mechanisms. Proof-like reasons for any access query are provided, such as who has access to what resource, built from the policy statements themselves, independent of the access check mechanism that provide access. Access is audited and policy-based reasons for access are provided based on the access control policy.

9 Claims, 7 Drawing Sheets

713   Examples of existing run time access check mechanisms

OTHER PUBLICATIONS

Ghemawat, S., et al., "The google file system," http://portal.acm.org/citation.cfm?id=945450&coll=ACM&dl=ACM&CFID=66708487&CFTOKEN=21303344, downloaded from the Internet on Mar. 6, 2006, 29-43.

* cited by examiner

ABSTRACTING SECURITY POLICY FROM, AND TRANSFORMING TO, NATIVE REPRESENTATIONS OF ACCESS CHECK MECHANISMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

BACKGROUND

Security Policy configuration is typically "one-way"; once the intent has been configured, it is extremely difficult, if not impossible, to query and measure the intent from what has been configured. Very often, what can be expressed often falls short of what needs to be expressed. Changes to intent are extremely difficult when intent is tightly coupled with detailed configuration. Additionally, legacy access check mechanisms outlive their usefulness as oftentimes the configured policies cannot be easily migrated. To analyze the system, all accesses must be dutifully audited and carefully reconciled with the intent as embodied in the configured security policy, requiring substantial human effort. As a result, users face the following problems:

1. No way to define access control policy centrally that can be enforced on multiple file servers distributed across an administrative domain
2. No way to define access control policy centrally for multiple applications independent of the authorization evaluation mechanism in each application
3. No uniform way to define audit data collection policy centrally for resources distributed across an administrative domain
4. No way to identify accesses that violate the defined access control policy
5. No way to automatically check for consistency between defined access control policy and the behavior of authorization evaluation mechanisms
6. No way to group resources across applications and policy stores for applying common authorization policy
7. No business-friendly user-experience (UX) for supporting delegation of rights on resources and of specifying authorization policy.
8. No easy mechanism to delegate personal permissions to other principals or mechanism to share the administrative burden between principals in a tightly constrained manner The root of the problem is that there is no explicit preservation of policy intent separate from what's native to the access check mechanism. Policy is configured with one purpose: for the access check mechanism to consume it to dictate whether access ought to be granted. Given this, policy representation is biased towards optimizing the performance of the access check, which is undeniably important. But the price to pay has been that it is extremely hard to unearth the meaning of what has been configured. Even in a homogenous environment, such as multiple different shares with the same or similar access control list (ACL) configurations, it is not easy and often impossible to systematically discern that the same policy was applied to all of these shares, and therefore recapture the intent behind that policy. Heterogeneous environments exacerbate this problem. When policy is deeply mired in the representations native to the access check implementations, there is little chance of extracting abstract policy from what has been configured in the native control mechanisms. Since the policy intent itself is not independently persisted and managed, it is impossible to express anything richer than what the underlying access check mechanism allows. The implication is that there ends up being a wide gap between the intent and the implementation of that intent in the native policy configuration formats.

Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, abstracting security policy from, and transforming to, native representations of access check mechanisms is provided. For several embodiments, a method for implementing a computer resource access control policy comprises abstracting an access control policy from access check mechanisms. The access check mechanisms have native policy expression capabilities that may be more limited than the access control policy. Also, a system for implementing a computer resource access security policy comprises means for auditing a resource access, and means providing reasons (according to the access control policy) why a particular audited access was allowed. The reasons provided are built from the access control policy itself, independent of access check mechanisms that have policy expression capabilities more limited than the access control policy.

Below is a description of other advantages and features of the invention.

BRIEF DESCRIPTION OF THE DRAWINGS

Abstracting security policy from, and transforming to, native representations of access check mechanisms is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Example Computing Environments

Figure 1:
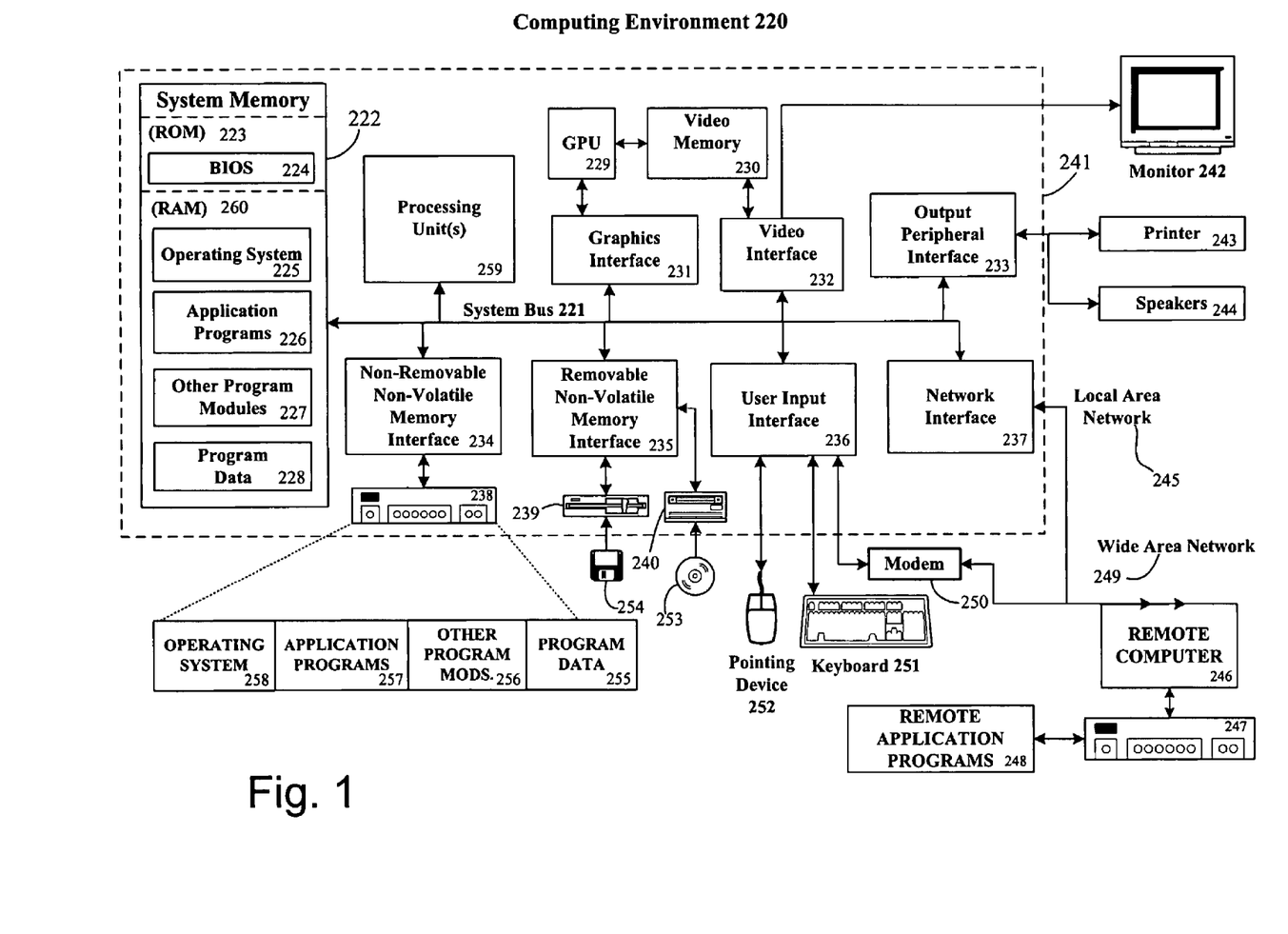
FIG. 1 is a block diagram representing an exemplary computing device suitable for use in conjunction with abstracting security policy from, and transforming to, native representations of access check mechanisms.

Referring to FIG. 1, shown is a block diagram representing an exemplary computing device suitable for use in conjunction with implementing the processes described above. For example, the computer executable instructions that carry out the processes and methods for abstracting security policy from, and transforming to, native representations of access check mechanisms may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
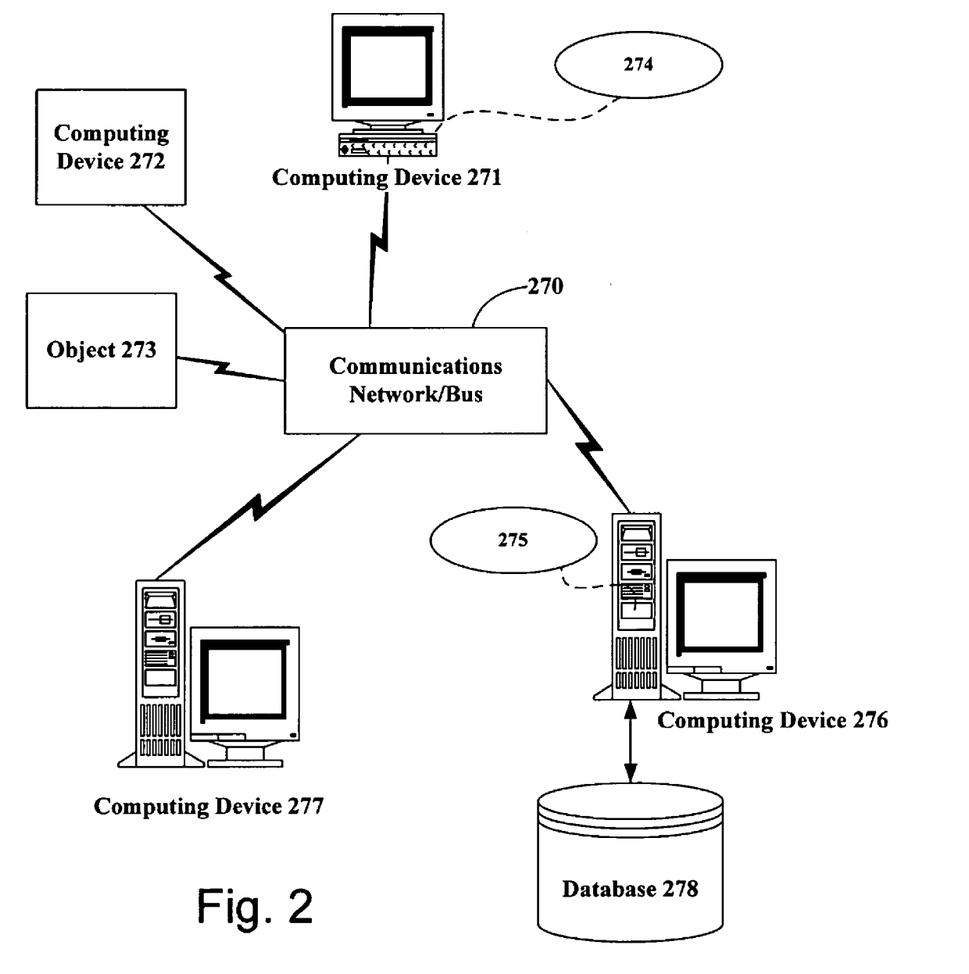
FIG. 2 illustrates an exemplary networked computing environment in which many computerized processes may be implemented to perform abstracting security policy from, and transforming to, native representations of access check mechanisms.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing the abstracting security policy from, and transforming to, native representations of access check mechanisms. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the invention should not be limited to any single embodiment, but rather should be construed in breadth and scope in accordance with the appended claims.

Abstraction and Access Check Mechanisms

Drawing an analogy from software development, management of software became (relatively) simpler with the advent of abstractions contained in high-level languages. It is hard even to imagine large scale software projects developed solely in a close-to-the-hardware language like assembly. Most modern-day programs are written without much regard to the underlying execution environment and rely on compilers to preserve the semantics. Various transformations of the low-level code such as compiler optimizations can make recapturing the original high level intent impossible. As such, the meaning of the program exists in a model that is independent of its execution environment. One can query and understand many facets of what a program entails (not all facets, of course, in programs written in Turing-complete languages) without having to actually run it.

Security policy warrants similar treatment. Currently security policy representation mechanisms are largely independent pieces of data, and ad-hoc in their expressiveness. Even a simple logical model, language or abstraction would go a long way towards managing the intent. Security policy does not need the expressive power of programming languages; just enough semantics that allow for the composition of policy statements. The primary goal is that the meaning of the policy should be discernable independent of the access check mechanisms. When viewed in this light, security policy management described herein proves useful for such independence between the security policy and the access check mechanisms. In order to do so, a language is used that allows one to express forms of statements and assertions prevalent in access control and the ability is provided to reason with expressions in the language, that is, perform queries, logic computations and derive proofs.

The language is an expressive Policy Model or Policy Language, independent of the access check mechanisms and is rich enough to capture the meaning. Note that any language that has the following qualities may be suitable.

Expressiveness:

a. Ability to specify assertions that map principal to resources, and principals to attributes or properties, including property values b. Ability to specify who made such assertions c. Ability to specify assertions predicated on other principals making other (or similar) assertions. These can range from very specific to very general d. Ability to construct higher-level policy constructs using the expressiveness primitives. That is to say that the primitives are not overly constraining in their expressive scope.

Declarative Semantics & Monotonicity:

a. It is possible to compose and combine assertions and derive the same set of consequences regardless of the order in which they are processed.

b. It is possible to justify the consequences with "proofs" constructed from the policy statements.

c. It is possible to add new assertions or rules without contradicting conclusions drawn from existing assertions. Revocation of rules can be permitted.

Computational Tractability:

a. It is possible to compute consequences of declarative assertions in a performant fashion.

b. Analysis and query of audit trails is performant

Primitives of the back-end access check mechanism (or some desired subset of the back-end) are identified. That is, the data that is consumed by the existing access-check mechanisms to make a decision to allow access. Examples of these primitives are role definitions and role assignments (Authorization Manager (AzMan) and ASP.NET); rights-management licenses (RMS, IPP); ACLs (fileshares, firewalls etc.)

These primitives are then characterized as predicates in the policy language. For example, an access control entry (ACE) in an ACL may correspond to the predicate "chuckr can read foo.txt". Another example may be, for an AzMan application, that "chuckr is in the role developer". There may be many such primitives depending on the different access check mechanisms. These primitives are referred to as permits.

The consequent permits of the declarative policy are then computed. Depending on the scope of applicability, for efficiency purposes, heuristic methods may be used to identify the subset of the policy that needs to be considered for computing the consequent permits but this invention does not speak to that. It is assumed that the permits are recreated every time the policy is invalidated. The resultant permits are used to configure the appropriate native access check mechanisms. Access check consumes these configurations when access requests are made.

Audit events are created when accesses are made, and these are reconciled with the policy represented in the policy model abstraction resulting in policy-driven audit information. Additionally, queries may be made on the policy independent of the access check mechanisms to comprehend what accesses the policy allows and why.

Example Scenarios

The following example illustrates the separation of intent from implementation, and configuring the meaning of the intent in the low-level access check mechanism.

The example below demonstrates the modeling of a discretionary access control system over a system that has very limited expressive capabilities. Specifically, the only information that the access check mechanism can represent is what actions a specific principal can perform over a specific resource. Note, for the purposes of this example, suppose that it even lacks the ability to record who the owner is. Statements of the above nature are treated to have been uttered by the system. The system itself may be identified or modeled with a key.

Figure 3:
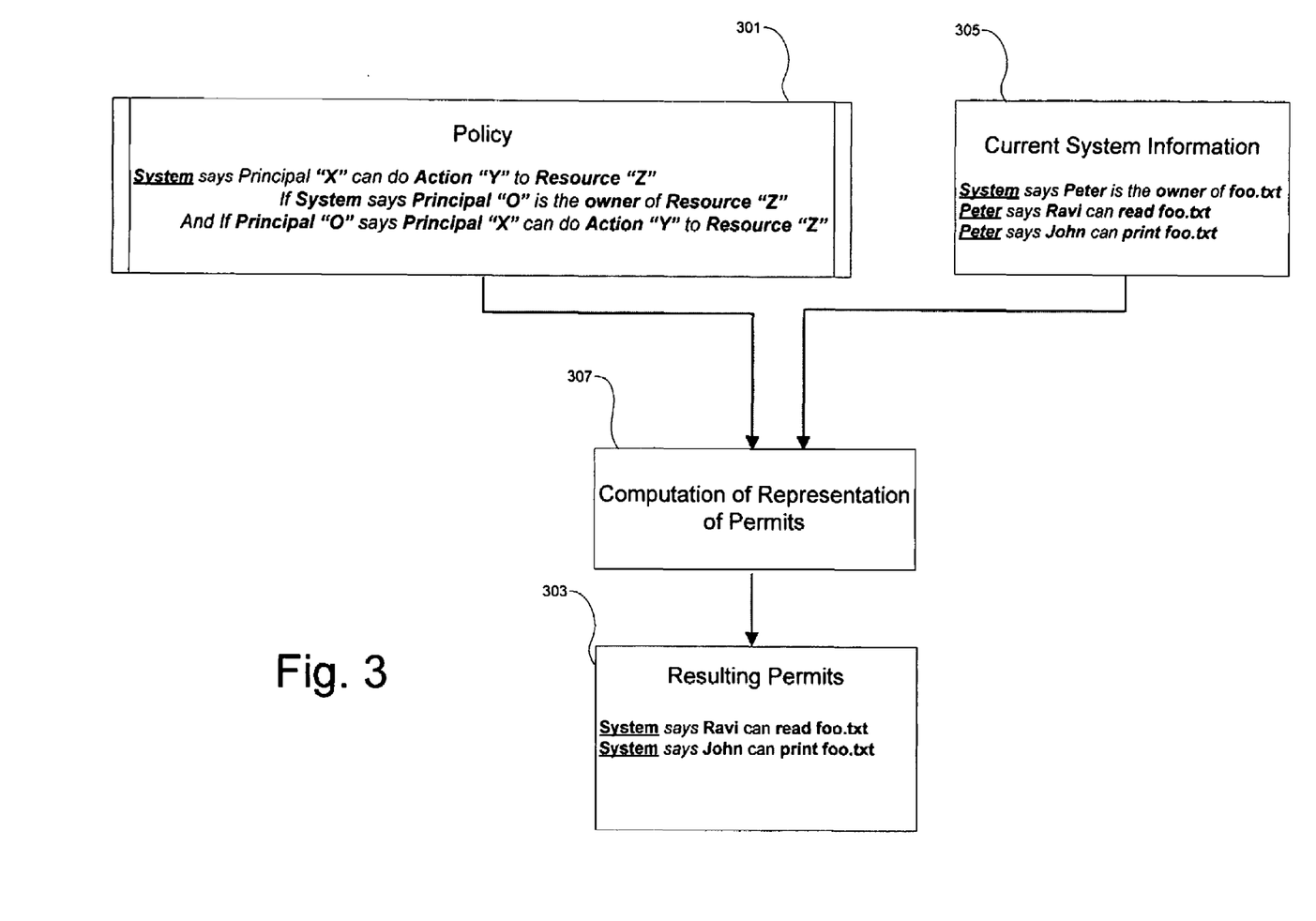
FIG. 3 is a block diagram illustrating the computation of representation of permits using an example security policy.

Referring next to FIG. 3, shown is a block diagram illustrating the computation of representation of permits using the example security policy below.

The italicized statements are things that are not expressible in the access control system, yet can be represented in the policy model. These statements reflect the intent behind the policy 301. The non-italicized statements are those that are expressible in the access control system, and what the implementation can handle. These are the "permits" 303.

The objective is to conclude what can be expressed in the access control system (i.e., non-italicized statements 303) from the policy statements (i.e., italicized statements 301).

The following policy rule 301 captures the above behavior:

System says Principal "X" can do Action "Y" to Resource "Z"

If System says Principal "O" is the owner of Resource "Z"

And If Principal "O" says Principal "X" can do Action "Y" to Resource "Z"

Suppose the following information 305 is known:

System says Peter is the owner of foo.txt

Peter says Ravi can read foo.txt

Peter says John can print foo.txt

From the above, it is possible to logically conclude 307 the following permits 303:

System says Ravi can read foo.txt

System says John can print foo.txt

Figure 4:
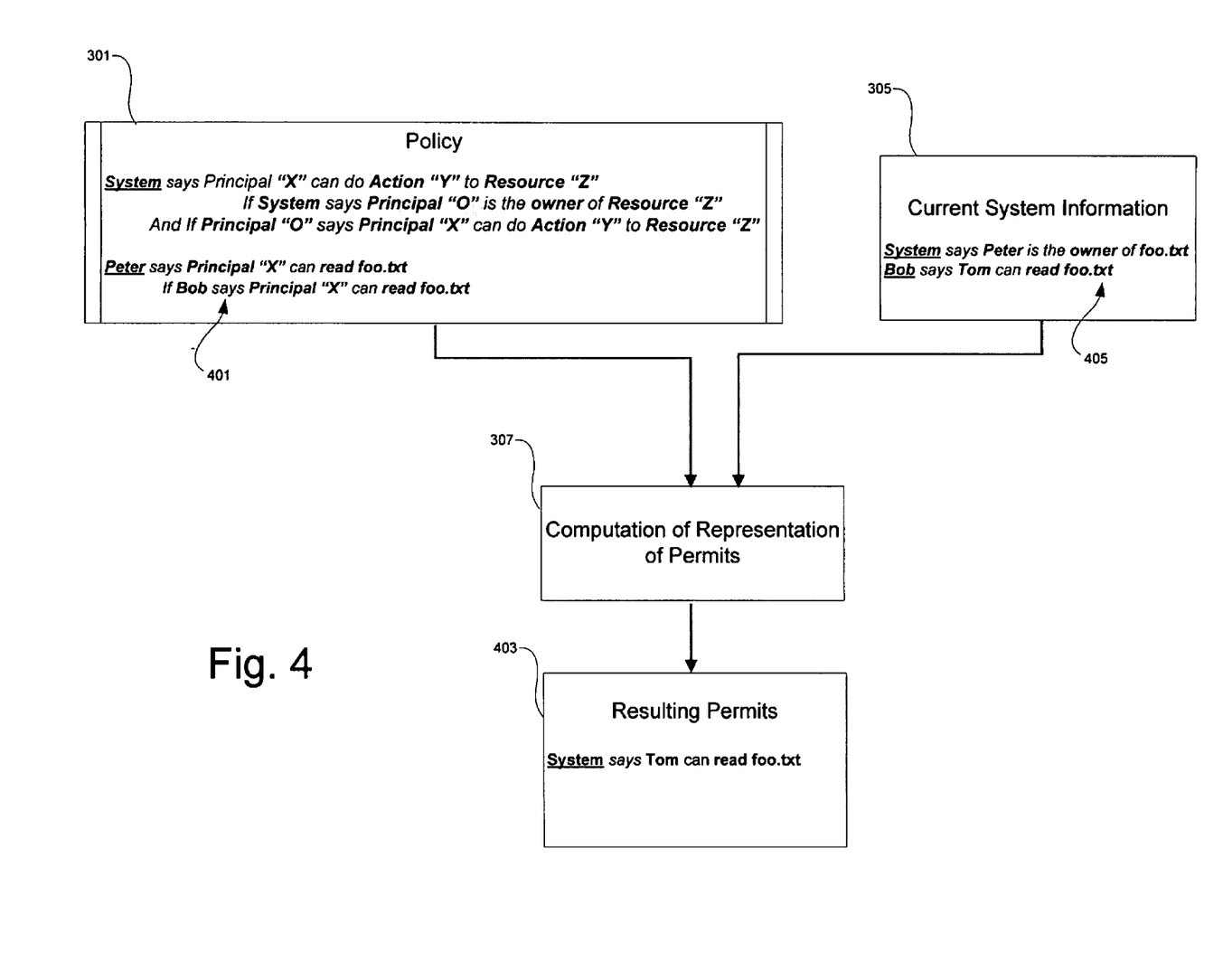
FIG. 4 is a block diagram illustrating the computation of representation of permits using an additional example security policy enabling delegation.

Additionally, the owner can delegate all or parts of this ability to anyone they choose. Referring next to FIG. 4, shown is a block diagram illustrating the computation of representation of permits using an additional example security policy regarding delegation. The following statement 401 of the policy 301 represents in the example Peter's intent to delegate the ability for providing read permissions for foo.txt to Bob.

Peter says Principal "X" can read foo.txt

If Bob says Principal "X" can read foo.txt

Suppose the following additional information 405 is known:

Bob says Tom can read foo.txt

It is possible to logically conclude 307 the following:

Peter says Tom can read foo.txt

And subsequently logically conclude 307 the following permit 403:

System says Tom can read foo.txt

Figure 5:
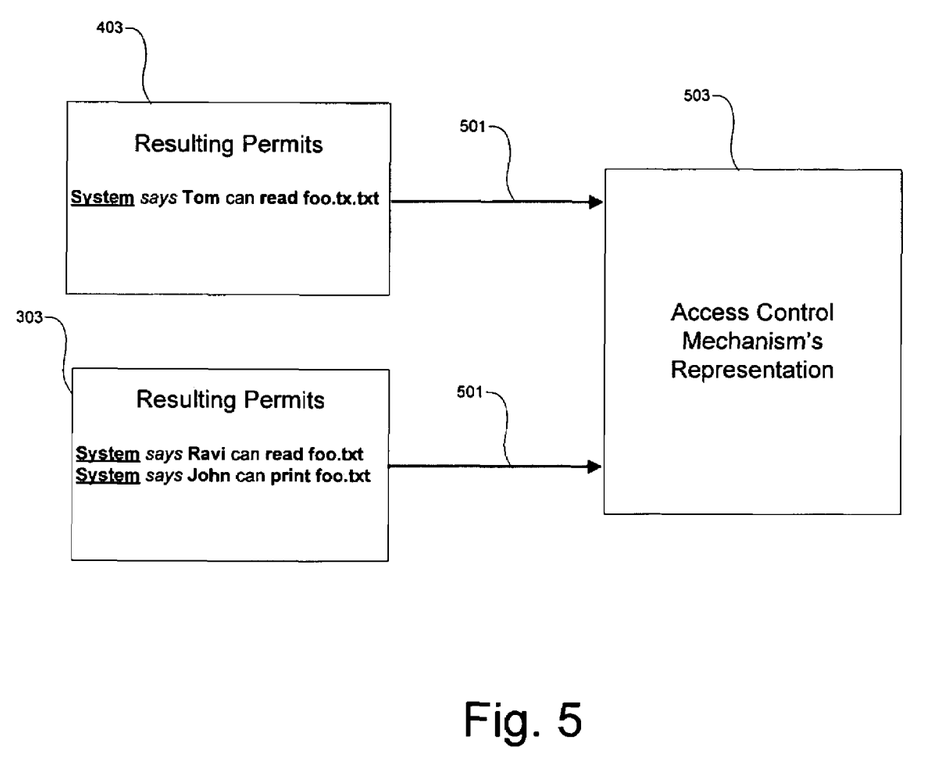
FIG. 5 is a block diagram illustrating injecting resulting example permits into an access check mechanism's representation.

Referring next to FIG. 5, shown is a block diagram illustrating injecting the resulting example permits into an access check mechanism's representation. It is these non-italicized statements 403 303 (i.e., permits) that are injected 501 into the access check mechanism's representation 503 to implement the security policy 301.

Figure 6:
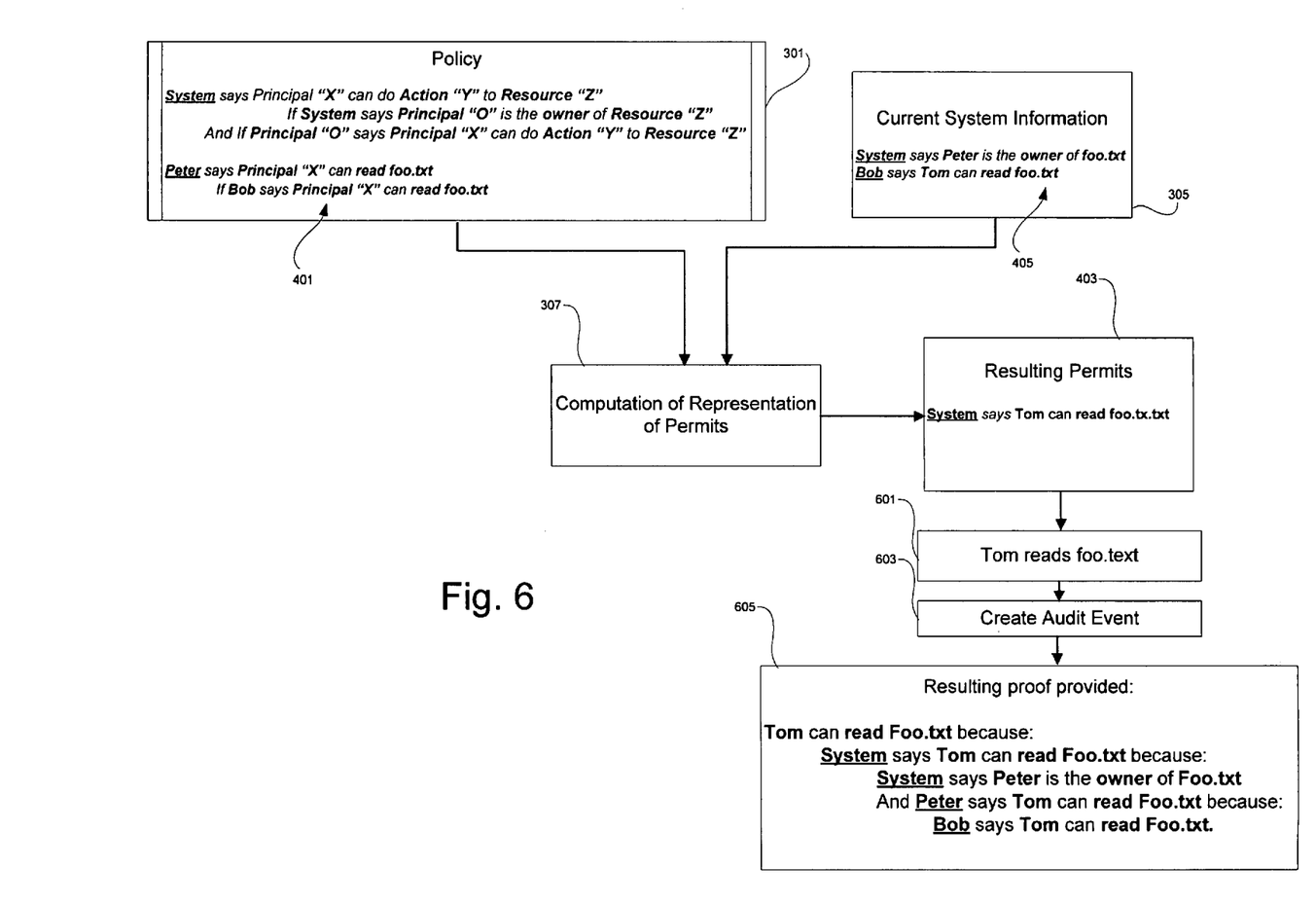
FIG. 6 is a block diagram illustrating providing a proof resulting from an example access and audit event.

Referring next to FIG. 6, shown is a block diagram illustrating providing a proof resulting from an example access and audit event. Suppose Tom does read foo.txt 601 and the corresponding audit event is created 603. The complete reason is computed 605 for Tom being allowed to read foo.txt using the policy statements 301.

That is, the following proof is provided 605, constructed from the policy statements 301 themselves.

Tom can read Foo.txt because:

System says Tom can read Foo.txt because:

System says Peter is the owner of Foo.txt

And Peter says Tom can read Foo.txt because:

Bob says Tom can read Foo.txt.

The above answer is completely independent of the configurations in the native access check mechanisms 503. It is the real policy audit trail of why what happened and is systematically computed from the policy statements 301 themselves. These audit trails and policy statements can of course be augmented with a wide assortment of extra information, such as time stamps, locations where the statement was made, etc.

Figure 7:
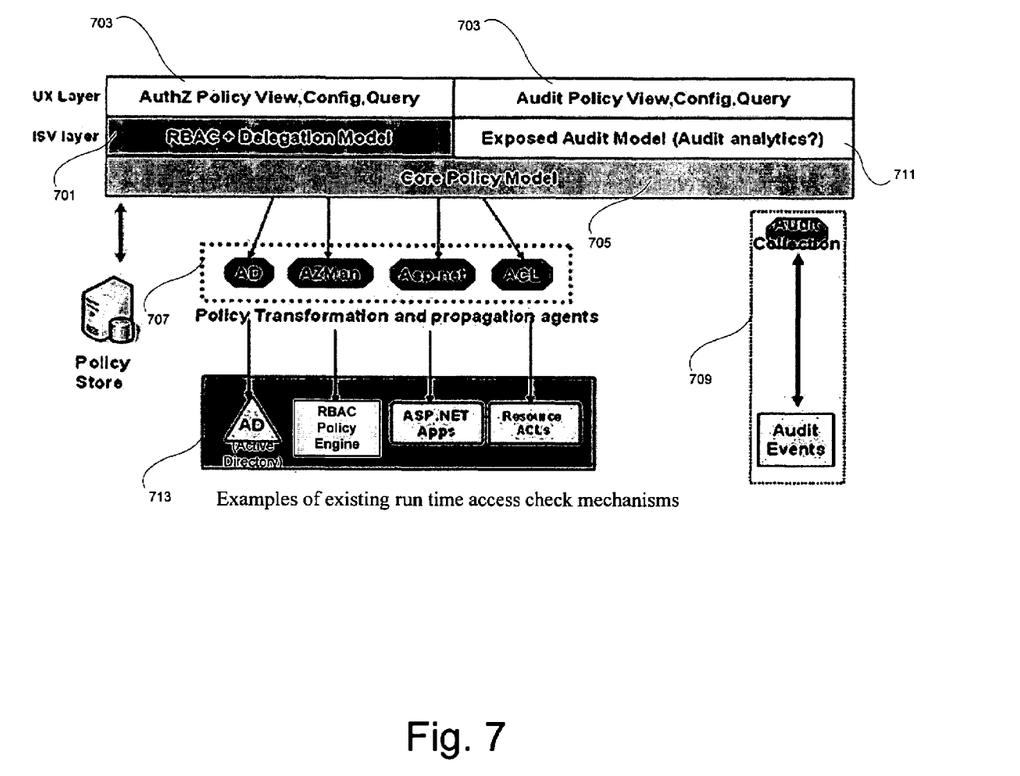
FIG. 7 is a block diagram illustrating an example system implementing abstracting security policy from, and transforming to, exemplary native representations of access check mechanisms.

Referring next to FIG. 7, shown is a block diagram illustrating an example system implementing abstracting security policy from, and transforming to, native representations of access check mechanisms. Note that FIG. 7 shows one possible manifestation, and others are possible and contemplated that provide the same or similar results.

A role based access control (RBAC) mechanism 701 that supports delegation is exposed to the users through suitable policy-driven user interfaces 703. The users who configure policy only view those aspects of the policy that they are allowed to view or configure. Once such policy is configured, its meaning is captured in the core policy model 705, which is the heart of the system.

The core policy model 705 is used for the following purposes:

Serve as common representation for all the policy to support uniform querying of policy that may have been configured through heterogeneous views.

Drive user experiences and user views (for example, the result of an administrator delegating their privileges to an assistant will result in the assistant's user experience changing to reflect their new administrative privileges).

Allow for the computation of representation of permits in the format that is suitable to the access check mechanism (eg. ACLs and AzMan Roles) 707.

Rationalize accesses manifested as audit events 709 with the policy of the exposed audit model 711 to determine how the policy accommodated the access.

A system that has most of the above features effectively adds fine-grained delegation capabilities, for example, to AzMan roles and ACLs without changing any of the low-level access check mechanisms 713.

In conclusion, abstracting access control policy from the access check mechanisms allows for richer expression of policy (using a declarative model with semantics or an imperitive model) than what is permitted by the access check mechanisms. Proof-like reasons for any access query, such as who as access to what resource, are built from the policy statements themselves, independent of the access check mechanism that provides access. "What-if" capabilities query the policy to understand the impact of changing the policy without actually changing the access check configurations. Permissions are configured across multiple access check mechanisms as the result of computing logical consequences from a single set of policy statements. Access is audited and policy-based reasons are provided for access and identifying access attempts that are discordant with the policy. This may assist in solving problems where policy may be overly lax, in which case audit can help to discover holes within the policy. It also creates a forensic trail that allows investigators (both corporate and official) to determine who used their access for nefarious ends.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A method for implementing a computer resource access control policy comprising:

receiving an access control policy that includes policy statements, wherein said policy statements are in an abstracted policy language, and wherein the abstracted policy language is not understood by an access check mechanism;

identifying predicates in said policy statements, wherein the predicates are in the abstracted policy language transforming, via a computer, the predicates in the abstracted policy language into primitives, wherein the primitives are in a language native to said access check mechanism;

configuring permissions at said access control mechanism based on said primitives, wherein said permissions are configured to enable said access check mechanisms to dictate when access is granted, wherein said permissions are configured across multiple access check mechanisms;

receiving a query regarding access to resources; and providing results of said query along with reasons, according to said access control policy, why the particular results were provided, said reasons built from said access control policy itself, independent of said multiple access check mechanisms.

2. The method of claim 1 further comprising:
querying said access control policy to determine an impact of changing said access control policy; and
providing information detailing said impact of changing said access control policy without changing said access check configurations.

3. The method of claim 2 further comprising:
auditing a resource access; and
providing reasons, according to said access control policy, why a particular audited access was allowed, said reasons built from said access control policy itself, independent of said multiple access check mechanisms.

4. The method of claim 3 further comprising: identifying resource access attempts that are discordant with said access security policy based on said access control policy itself, independent of said multiple access check mechanisms.

5. A non-transitory computer readable storage medium having instructions thereon for implementing a computer resource access control policy comprising:
receiving an access control policy that includes policy statements, wherein said policy statements are in an abstracted policy language, and wherein the abstracted policy language is not understood by an access check mechanism;
identifying predicates in said policy statements, wherein the predicates are in the abstracted policy language;
transforming, via a computer, the predicates in the abstracted policy language into primitives, wherein the primitives are in a language native to said access check mechanism;
configuring permissions at said access control mechanism based on said primitives, wherein said permissions are configured to enable said access check mechanisms to dictate when access is granted, wherein said permissions are configured across multiple access check mechanisms;
receiving a query regarding access to resources; and
providing results of said query along with reasons, according to said access control policy, why the particular results were provided, said reasons built from said access control policy itself, independent of said multiple access check mechanisms.

6. The non-transitory computer readable storage medium claim 5 further comprising:
querying the access control policy to determine an impact of changing the access control policy; and
providing information detailing said impact of changing the access control policy without changing the access check configurations.

7. The non-transitory computer readable storage medium claim 6 further comprising:
auditing a resource access; and
providing reasons, according to the access control policy, why a particular audited access was allowed, said reasons built from the access control policy itself, independent of said multiple access check mechanisms.

8. The non-transitory computer readable storage medium of claim 7 further comprising:
identifying resource access attempts that are discordant with said access security policy based on said access control policy itself, independent of said multiple access check mechanisms.

9. A system for implementing a computer resource access control policy comprising:
a processor for executing computer-executable instructions, the computer-executable instructions comprising instructions for:
receiving an access control policy that includes policy statements, wherein said policy statements are in an abstracted policy language, and wherein the abstracted policy language is not understood by an access check mechanism;
identifying predicates in said policy statements, wherein the predicates are in the abstracted policy language;
transforming the predicates in the abstracted policy language into primitives, wherein the primitives are in a language native to said access check mechanism; and
configuring permissions at said access control mechanism based on said primitives, wherein said permissions are configured to enable said access check mechanisms to dictate when access is granted, wherein said permissions are configured across multiple access check mechanisms;
receiving a query regarding access to resources; and
providing results of said query along with reasons, according to said access control policy, why the particular results were provided, said reasons built from said access control policy itself, independent of said multiple access check mechanisms.

* * * * *